United States Patent
Sarajian

(10) Patent No.: US 6,656,558 B1
(45) Date of Patent: Dec. 2, 2003

(54) HIGH TEMPERATURE RESISTANT MASKING DEVICES WITH TABS

(75) Inventor: Kissak T. Sarajian, Montrose, CA (US)

(73) Assignee: Engineered Products & Services, Inc., Menomonee Falls, WI (US)

( * ) Notice: Subject to any disclaimer, the term of this patent is extended or adjusted under 35 U.S.C. 154(b) by 0 days.

(21) Appl. No.: 09/367,374

(22) PCT Filed: Dec. 15, 1998

(86) PCT No.: PCT/US98/26594

§ 371 (c)(1),
(2), (4) Date: Aug. 12, 1999

(87) PCT Pub. No.: WO99/31192

PCT Pub. Date: Jun. 24, 1999

Related U.S. Application Data

(60) Provisional application No. 60/069,495, filed on Dec. 15, 1997.

(51) Int. Cl.[7] .............................................. A61F 13/02
(52) U.S. Cl. ..................... 428/42.2; 428/42.3; 428/343; 428/352; 428/355 RA; 428/542.2; 428/542.6; 428/914
(58) Field of Search ................ 428/41.7, 40.1, 428/124, 192, 343, 41.8, 42.2, 42.3, 43, 101, 352, 355 RA, 542.2, 914; 156/579; 118/504, 301, 406; 52/741.3

(56) References Cited

U.S. PATENT DOCUMENTS

| | | | |
|---|---|---|---|
| 3,386,846 A | 6/1968 | Lones | 117/11 |
| 4,454,180 A | 6/1984 | La Mers | 428/42 |
| 4,550,683 A | 11/1985 | Jones | |
| 4,787,158 A | 11/1988 | Vitol | |
| 5,037,501 A | 8/1991 | Lawson | 156/527 |
| 5,098,786 A | 3/1992 | Hanke | 428/343 |
| 5,441,769 A | 8/1995 | Ross | |
| 5,464,692 A | 11/1995 | Huber | |
| 5,468,538 A | 11/1995 | Nameche | 428/101 |
| 5,514,442 A | 5/1996 | Galda et al. | |
| 5,618,600 A | 4/1997 | Denklau | |
| 5,631,055 A | 5/1997 | Vines et al. | |
| 5,654,055 A | 8/1997 | Cox et al. | 428/41.7 |
| 5,776,572 A | 7/1998 | Lipson | |
| 5,800,894 A | 9/1998 | Navis | 428/41.7 |

FOREIGN PATENT DOCUMENTS

| | | |
|---|---|---|
| CA | 2075631 | 11/1992 |
| EP | 0506915 | 7/1992 |
| WO | WO/9206794 | 4/1992 |
| WO | WO/9216367 | 10/1992 |

OTHER PUBLICATIONS

Catalog of the Shercon Company, 1823 San Fernando Road, Los Angeles, CA 90065 Dated: Not later than Sep. 26, 1997.
Catalog of the Echo Corporation, 1026 Hanson Court, Milpitas, CA 95035 Dated: Not later than Sep. 26, 1997.

*Primary Examiner*—Deborah Jones
*Assistant Examiner*—Abraham Bahta
(74) *Attorney, Agent, or Firm*—Jansson, Shupe & Munger, Ltd.

(57) ABSTRACT

A high temperature resistant masking device (10) comprising a substrate having a top surface (26) and a bottom surface (28) with an adhesive applied to the bottom surface (28) of the substrate for removable attachment to a masking surface. The masking device (10) includes a pull tab (12) extending upwardly from the device's center portion for facilitating easy placement and removal of the masking device (10) from the masking surface. The masking devices (10) are die-cut into various shapes and sizes, and placed on rolls of release liner so that they may be readily applied to parts requiring masking during a painting or coating process.

25 Claims, 2 Drawing Sheets

HIGH TEMPERATURE RESISTANT MASKING DEVICES WITH TABS

RELATED APPLICATIONS

This application is a 35 U.S.C. §371 national stage filing of International Application Ser. No. PCT/US98/26594 filed Dec. 15, 1998, now abandoned, which claims priority from U.S. Provisional Patent Application Ser. No. 60/069,495 filed Dec. 15, 1997, now abandoned.

BACKGROUND OF THE INVENTION

The present invention relates to masking devices, and more particularly, to high temperature resistant masking devices having pull tabs extending upwardly therefrom to facilitate easy removal of the masking devices from a masking area.

Masking plays a vital role in the painting or coating of parts used in the automotive, aerospace, electronics and other industries. The painting or coating of parts may involve liquid coating, plating, powder coating or electroplating. The coating may be applied by a variety of methods including brushing, rolling, spraying, dipping, flow-coating, electrostatic coating, and submersion in deposition tanks. The liquid, powder or plating material may be applied to wood, fiberglass, or metal surfaces in order to protect and strengthen those surfaces. The coating protects the surface of a part by preventing electrical leakage, oxidation, corrosion and decay. Once the coating is applied, it is often cured at temperatures between 200–600° Fahrenheit to harden and cross-link the coating on the surface. After the curing process is complete, the cured coating forms a very strong protective layer on the surface that is highly resistant to scratching and chipping.

In most applications, a protective coating is to applied to certain areas of a surface but not to other areas of the surface. The areas where the coating is not to be applied must be covered or masked off. Typically, a paper or polyester film element in the form of masking tape is applied to the surface areas to be masked. The masking tape generally has an adhesive on one side so that it may be affixed to the surface to be masked. Once the painting or coating process has been completed, the masking tape is removed from the surface.

There are problems associated with masking areas of a surface during painting or coating. One problem is that the masking tape is often hard to remove from the surface after it has been through the coating process. This is due, at least in some part, to the temperatures used in the curing process. The masking tape must withstand high curing temperatures of approximately 200–600° Fahrenheit. Usually, a great deal of time and effort is required to remove the tape from the masking area. Technicians often use razor blades, knives, screw drivers or other devices to remove the masking tape. These devices often cause scratches or cuts on the surface of the coated part. Second, occasionally the thickness of the coating is so thick that it covers a standard masking device making it impossible to remove.

Thus, it is desirable to provide masking devices which are easily removable from the masking surfaces and masking devices.

SUMMARY OF THE INVENTION

The present invention provides masking devices for masking certain areas of a surface during liquid coating, powder coating, plating or electroplating. The masking devices are preferably die-cut from sheet material into substrates, an adhesive is applied to the bottom surface of the substrates, a tab is formed extending upwardly from the top surface of the substrate, and the substrate is affixed to a release liner. The masking devices are then removed from the release liner and applied to a masking surface.

The masking devices comprise a substrate having a top surface and a bottom surface, with an adhesive applied to the bottom surface. A tab extending upwardly from the top surface of the substrate is provided to facilitate easy removal of the masking device from the masking surface. The tab consists of two side members which are formed when the substrate is pushed inwardly from two opposite sides towards the center. The two side members become affixed together when the bottom surfaces of each side member come in contact with each other. The adhesive is preferably only applied to a portion of the bottom surface of the side members to ensure that the side members are securely bonded together. The process of creating the tabs also creates two folding lines along the base of the tab and a center apex at the top of the tab.

The masking devices are preferably made from a unitary substrate material, but could also be made from two separate substrates which are joined together during formation of the tab. The two substrates are affixed together when the bottom surfaces of the side members having adhesive applied thereto come in contact with each other.

The method of making the masking devices involves die-cutting a sheet of flexible material into desired substrate shapes, applying adhesive to the bottom surface of the die-cut substrates, forming a pull tab from the substrate that extends upwardly from the top surface of the substrate, and applying the tabbed substrates to a release liner for use in masking surface areas of parts that are to be painted or coated.

Various other features, aspects and advantages of the invention may be apparent to those skilled in the art from the following drawings and detailed description of the invention.

DETAILED DESCRIPTION OF THE INVENTION

The present invention provides masking devices that are used for masking off areas of a surface during liquid coating, powder coating, plating or electroplating. The masking devices are die-cut into various shapes and sizes, and placed on rolls of release liner so that they may be readily used for masking. The masking devices are removed from the release liner and applied to the surface areas to be masked.

Figure 1:
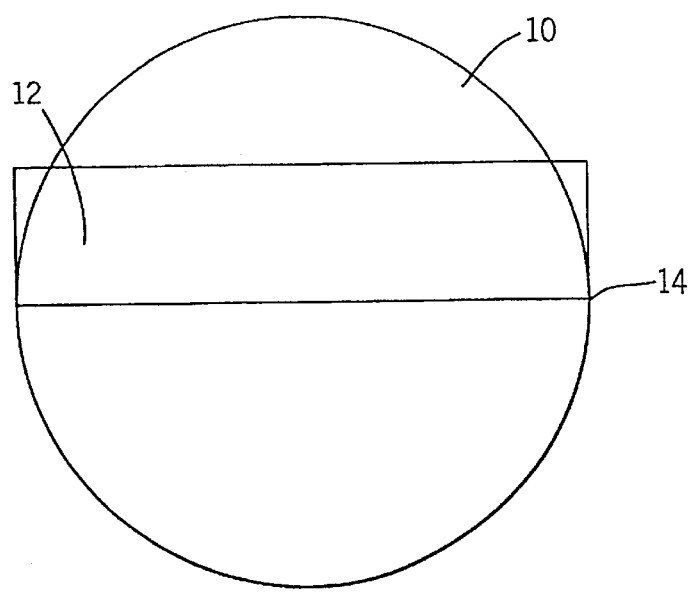
FIG. 1 is a perspective view of a masking device in accordance with the present invention.

FIG. 1 shows a masking device 10 having a pull tab 12 extending upwardly from the device's center portion 14. The pull tab 12 is used to ease the application and, particularly, the removal of the masking device from the masking area. The masking device 10 is simply applied to the desired masking area by gripping the tab, removing it from the release liner and applying it to the masking surface. The masking device 10 has a top surface 26 and a bottom surface 28. Adhesive is applied to the bottom surface 28 so that the masking device may be affixed to the masking area. After a part has been coated, the masking device is removed from the part by pulling upwardly from the tab.

The masking device 10 can be of any shape and size, the circular shape shown in the drawings is only one example. The masking device 10 is preferably made of a thin flexible material such as crepe paper, vinyl, polyester, mylar, kapton, etc.

Figure 2:
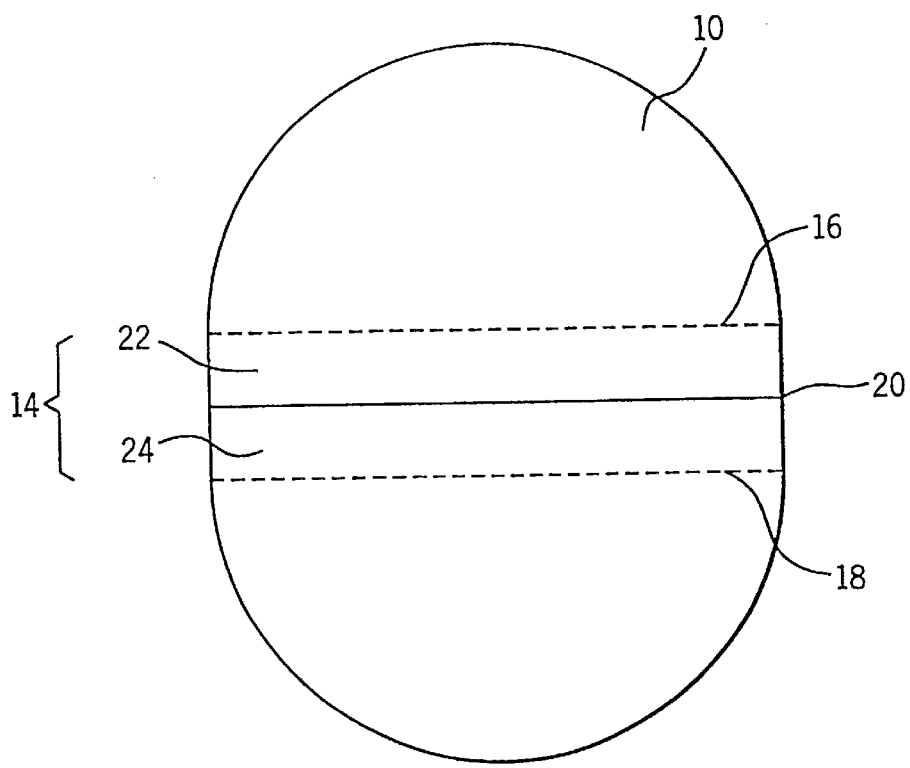
FIG. 2 is a top plan view of the masking device of FIG. 1 in its unfolded form.

FIG. 2 shows the masking device 10 in its unfolded form. The masking device 10 preferably consists of a unitary paper substrate having a top surface 26 and a bottom surface 28. As stated above, an adhesive is applied to the bottom surface 26 of the device 10 for removable attachment to a masking surface. The tab 12 is created by folding the masking device 10 close to the device's center portion 14 and along folding lines 16, 18 and 20. The two ends of the device opposite the center portion 14 are pushed inwardly toward the center of the device to create a tab 12 which rises upwardly from folding lines 16 and 18.

It is also possible for the masking device 10 to be made from two separate substrates that come together along line 20. The two substrates are joined together by tab 12. The tab is created by pushing the two substrates inwardly toward line 20 so that a tab rises upwardly from folding lines 16 and 18. Adhesive applied to the bottom surface of side members 22 and 24 cause the two substrates to be joined together at tab 12.

Figure 3:
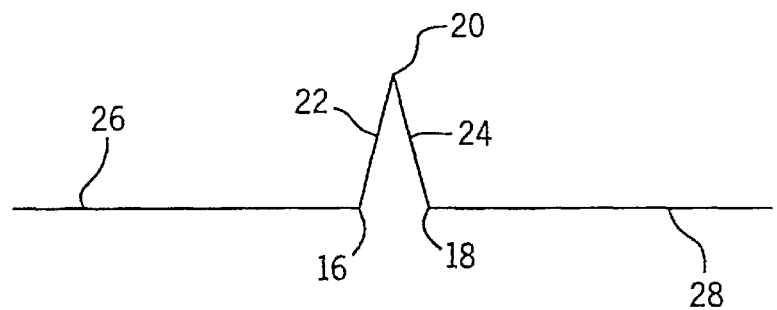
FIG. 3 is an enlarged side view of the masking device of FIG. 1 in its folded form.

FIG. 3 shows a side view of the masking element 10 in its folded form. The pull tab 12 consists of side members 22 and 24 that are folded together at the center apex 20. Preferably, adhesive is only applied to the bottom surface of one side member to ensure that the two side members are securely bonded together. So for example, side member 22 may have adhesive applied to its bottom surface while side member 24 does not, and vice versa.

Figure 4:
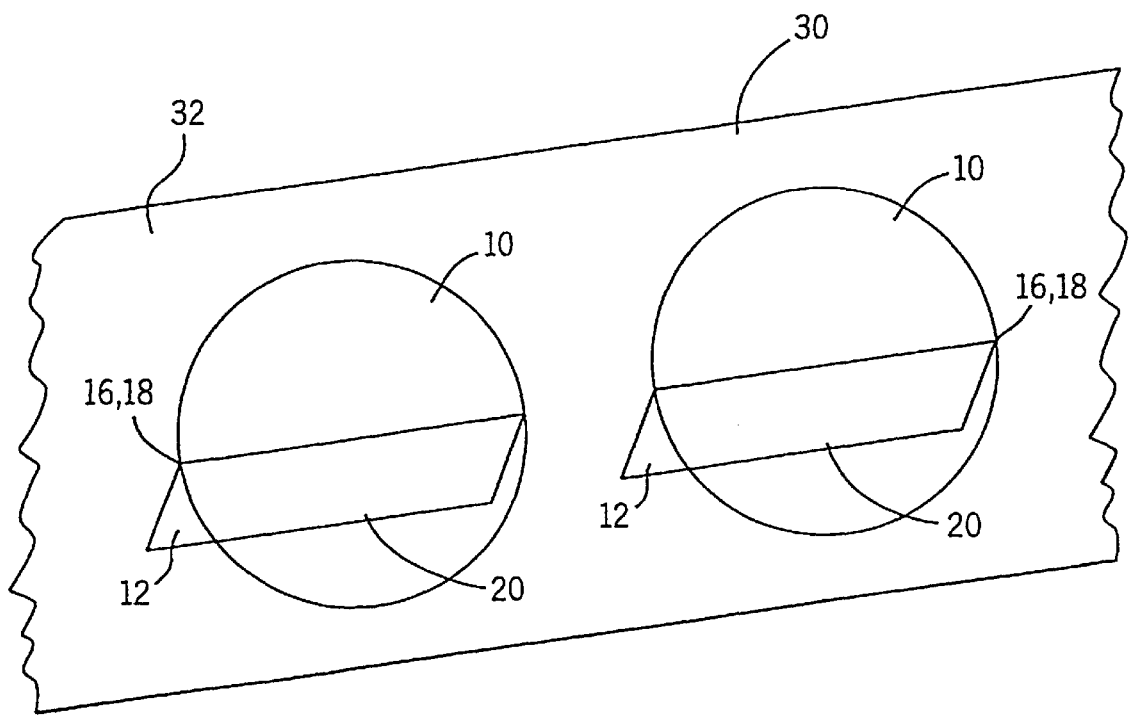
FIG. 4 is a perspective view of a plurality of masking devices affixed to a release liner.

FIG. 4 shows a plurality of masking devices 10 applied to a release liner 30. The release liner 30 has a coating on its top surface 32 that allows the masking devices 10 to be easily removed for attachment to the masking area of a part that is to be painted or coated. The release liner provides any easy way to package the masking devices for sale or use.

The masking devices 10 are die-cut from sheet material to form substrates of various shapes and sizes. Adhesive is applied to the bottom surface of the die-cut substrates and tabs are formed which extend upwardly from the top surface of the substrates. The tabbed substrates are then placed on the release liner 30 and rolled up into rolls to be used by various industries that require masking devices for powder or liquid coating.

The masking devices shown in the drawings are typically of those used to cover recessed reflectors on automobiles and trucks, grounding points on bus bars, and other areas where paint or another coating is not desirable.

It is recognized that various alternatives, modifications and equivalents may be apparent to those skilled in the art. Thus, the following claims should be interpreted to cover such alternatives, modifications and equivalents.

I claim:

1. A device for masking a surface including an upwardly-extending tab for gripping the masking device, comprising:
 a two-piece masking-device substrate having a top surface and a bottom surface, said masking-device substrate comprising:
  a first discrete substrate element having a fold line defining a base portion surface; and a first upwardly-extending side member portion including a first surface;
  a second discrete substrate element having a fold line defining a base portion and a second upwardly extending side member portion including a second surface, said side member portions being configured and arranged such that the side member portion first and second surfaces abut one another; and
 an adhesive on the abutting side member portion first and second surfaces, said adhesive joining the first and second discrete substrate elements such that the side member portions form the gripable tab extending upwardly from the masking-device substrate top surface; and
 an adhesive on the masking-device substrate bottom surface, said adhesive selected such that the masking-device substrate is removable from a surface to which the masking device is attached.

2. The masking device of claim 1, wherein the adhesive is selectively located on only a portion of the side member portion first and second surfaces.

3. The masking device of claim 2, wherein the adhesive is a silicone adhesive.

4. The masking device of claim 2, wherein the adhesive is a rubber based adhesive.

5. The masking device of claim 1, wherein the masking-device substrate is die-cut from sheet material into predetermined shapes and sizes.

6. The masking device of claim 1, further including a release liner having a surface and the masking device is removably attached to the release liner surface.

7. The masking device of claim 1, wherein the tab formed by the first and second side member portions extends upwardly from a center portion of the masking-device substrate.

8. The masking device of claim 1, wherein the substrate is made of a material selected from the group consisting of crepe paper, vinyl, polyester, mylar and kapton.

9. The masking device of claim 1, wherein the masking-device substrate is adapted to withstand temperatures of approximately 200 to 600 degrees Fahrenheit.

10. A masking device comprising:
 a two-piece substrate comprising first and second discrete substrate elements bonded together, the two-piece substrate having a top surface and a bottom surface;
 an adhesive on the two-piece substrate bottom surface, said adhesive permitting removable attachment of the two-piece substrate on a masking surface; and
 a tab for gripping the masking device, said tab extending upwardly from the two-piece substrate top surface and comprising bonded-together portions of the first and second discrete substrate elements.

11. The masking device of claim 10, further including a release liner having a surface and the making device is removably attached to the release liner surface.

12. The masking device of claim 10, wherein the tab comprises a first discrete substrate element first side member portion and a second discrete substrate element second side member portion, the side member portions having a top surface and a facing surface, the side members being bonded together along their facing surfaces by an adhesive on said facing surfaces.

13. The masking device of claim 12, wherein the first side member portion comprises a region of the first discrete substrate element defined by a fold line and the second side member portion comprises a region of the second discrete substrate element defined by a further fold line.

14. The masking device of claim 10, wherein the two-piece substrate is die-cut from sheet material into predetermined shapes and sizes.

15. The masking device of claims 10, wherein the tab extends upwardly from a center portion of the two-piece substrate.

16. The masking device of claim 10, wherein the two-piece substrate is made of a material selected from the group consisting of crepe paper, vinyl polyester, mylar and kapton.

17. The masking device of claim 10, wherein the two-piece substrate can withstand temperatures of approximately 200 to 600 degrees Fahrenheit.

18. The masking device of claim 1 wherein the adhesive joining the abutting side member portion first and second surfaces and the adhesive on the substrate bottom surface are identical adhesive materials.

19. A masking device comprising:
- a two-piece masking-device substrate having a top surface, a bottom surface and a tab projecting from the top surface, said substrate comprising:
  - a first discrete substrate element having a fold line defining a base portion and a first side member portion including a bottom surface; and
  - a second discrete substrate element having a fold line defining a base portion and a second side member portion including a bottom surface, said first and second side member portion bottom surfaces being joined together to form the masking-device substrate and the tab projecting therefrom; and
- an adhesive on the masking-device substrate bottom surface, said adhesive selected such that the masking-device substrate is removable from a surface to which the masking device is attached.

20. The masking device of claim 19, further including an adhesive on at least one of the first and second side member portion bottom surfaces, said adhesive joining together the first and second side member portion bottom surfaces.

21. The masking device of claim 20, wherein the adhesive is a silicone adhesive.

22. The masking device of claim 20, wherein the adhesive is a rubber based adhesive.

23. The masking device of claim 19 further including a release liner and the masking device substrate is removably attached to the release liner.

24. The masking device of claim 19, wherein the tab formed by the joined together first and second side member portion bottom surfaces extends upwardly from a center portion of the masking device substrate.

25. The masking device of claim 19, wherein the first and second discrete substrate elements are each made of a material selected from the group consisting of crepe paper, vinyl, polyester, mylar and kapton.

* * * * *

UNITED STATES PATENT AND TRADEMARK OFFICE
CERTIFICATE OF CORRECTION

PATENT NO. : 6,656,558 B1 Page 1 of 1
DATED : December 2, 2003
INVENTOR(S) : Kissak T. Sarajian It is certified that error appears in the above-identified patent and that said Letters Patent is hereby corrected as shown below:

<u>Column 3,</u>
Line 67, after "portion" delete "surface;".

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,656,558 B1 | Page 1 of 1 |
| APPLICATION NO. | : 09/367374 | |
| DATED | : December 2, 2003 | |
| INVENTOR(S) | : Sarajian | |

It is certified that error appears in the above-identified patent and that said Letters Patent is hereby corrected as shown below:

In column 3, claim 1, line 65 delete "surface;" after the word "portion".

In column 4, claim 11, line 51 delete "making" and insert -- masking --.

Signed and Sealed this

Sixth Day of October, 2009

David J. Kappos
*Director of the United States Patent and Trademark Office*